Patented Apr. 15, 1930

1,754,345

UNITED STATES PATENT OFFICE

OTTO BALZ, OF LUDWIGSHAFEN-ON-THE-RHINE, AND FRITZ REUSCHER, OF MANNHEIM, GERMANY, ASSIGNORS TO I. G. FARBENINDUSTRIE AKTIENGESELLSCHAFT, OF FRANKFORT-ON-THE-MAIN, GERMANY

CATALYTIC OXIDATION OF AMMONIA

No Drawing. Application filed August 3, 1925, Serial No. 48,006, and in Germany December 22, 1924.

When ammonia is catalytically oxidized by means of air in accordance with the usual methods the nitrogen oxids so obtained are in a dilute condition making large absorption rooms necessary. It has been repeatedly attempted to employ oxygen instead of air and thereby to reduce the absorption space required, but hitherto the risk of explosions and the high temperature generated in catalytic combustion have prevented these proposals from being carried into practice.

We have now found that oxygen or gases rich in oxygen can be employed with safety for the catalytic oxidation of ammonia and that highly concentrated oxids of nitrogen substantially free from gases alien to the reaction can be so produced with excellent yield, for example 90 percent and more of the theoretical yield when the ammonia is added by degrees and in a compartively small amount say less than about 10 per cent of the whole volume of gas each time before effecting catalytic combustion. The catalytic treatment after each addition may be effected with another catalytic mass each time, or with the same catalyst in a circulating system. By the addition of ammonia in small amounts the formation of an explosive mixture is avoided. The excess of heat generated by the catalytic treatment is suitably withdrawn or utilized, for example, for the production of steam. Contrary to what would have been expected, an interaction between nitrogen oxid already formed and a freshly added portion of ammonia according to the equation $$6NO + 4NH_3 = 5N_2 + 6H_2O$$

does not take place. A gas may be readily produced by this method containing 50 percent or more of nitrogen oxid which for absorption with water, dilute acid or alkaline media requires little absorption space. By absorption with water, an acid of more than 55 percent strength is readily obtained by this process, and the nitrogen oxides can also readily be separated from the reaction gases by a liquefaction or freezing method. Any oxygen that may be left after absorption or separation of the nitrogen oxids can be led back to the catalytic combustion process.

For example a mixture of 9 parts, by volume, of oxygen and 1 part, by volume, of ammonia is conveyed over a heated catalyst, for example a platinum catalyst, removing part of the heat after the reaction, whereupon a fresh quantity of ammonia equal to between 6 and 8 percent of the total volume of gas is added and the mixture is subjected to a second catalytic treatment. When the addition and catalysis are repeated a third and fourth time, the concentration of nitrogen oxid in the reaction gases is further increased.

Another form of the foregoing process consists in passing the reaction gases over again through the same contact mass or through a series of contact masses while continuously introducing a small amount of ammonia and about the required volume of oxygen or a gas rich in oxygen prior to catalytic treatment, and at the same time withdrawing a corresponding amount of reaction gas rich in nitrogen oxid after the catalytic treatment. In this case also, the oxygen left after absorption or separation of the nitrogen oxids from the withdrawn reaction gases may be returned into the circulation system for being utilized in the oxidation.

In either case the treatment may be effected at ordinary, reduced or elevated pressure, in some such cases the percentage of ammonia permissible may be higher and the number of treatments required in order to oxidize a given amount of ammonia can be accordingly reduced.

We claim:

1. The process of catalytic oxidation of ammonia which comprises subjecting to catalytic treatment a gas mixture comprising ammonia in an amount of less than about 10 per cent of the total volume of the gas mixture and oxygen and being substantially free from gases alien to the reaction.

2. The process of catalytically oxidizing ammonia which comprises passing a mixture of ammonia and oxygen containing about 10 percent ammonia through a heated catalytic mass whereby the ammonia is oxidized to form oxides of nitrogen, withdrawing part of the mixture rich in nitrogen oxides and leading the residual gases over again through the catalytic mass after adding a volume of oxygen and ammonia corresponding approximately to the amount of gas mixture withdrawn.

3. The process of catalytic oxidation of ammonia, which comprises subjecting to catalytic treatment a gas mixture substantially composed of nitrogen oxids and oxygen and less than about 10 per cent of ammonia, and alternately adding ammonia in about the same amount as has been consumed in the oxidizing reaction to the reaction mixture and repeating the catalytic treatment.

In testimony whereof we have hereunto set our hands.

OTTO BALZ.
FRITZ REUSCHER.